(12) United States Patent
Turski et al.

(10) Patent No.: US 7,975,240 B2
(45) Date of Patent: Jul. 5, 2011

(54) SYSTEMS AND METHODS FOR CONTROLLING A VISIBLE RESULTS SET

(75) Inventors: Andrzej Turski, Redmond, WA (US); Lili Cheng, Bellevue, WA (US); Matthew MacLaurin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 778 days.

(21) Appl. No.: 10/758,743

(22) Filed: Jan. 16, 2004

(65) Prior Publication Data

US 2005/0160079 A1   Jul. 21, 2005

(51) Int. Cl.
*G06F 3/048* (2006.01)

(52) U.S. Cl. ........ 715/854; 715/775; 715/776; 715/739; 715/713; 715/234; 715/730; 715/733; 707/999.007; 707/999.01; 707/999.1; 707/999.104; 707/E17.111; 345/594; 705/26.61

(58) Field of Classification Search ............. 345/619, 345/594; 715/739, 775, 776, 853, 854, 855, 715/713, 234, 730, 733; 707/1, 100, 999.007, 707/999.01, 999.1, 999.104
See application file for complete search history.

(56) References Cited

U.S. PATENT DOCUMENTS

| | | | |
|---|---|---|---|
| 5,414,809 A | | 5/1995 | Hogan et al. |
| 5,544,360 A | * | 8/1996 | Lewak et al. ........................ 1/1 |
| 5,675,782 A | * | 10/1997 | Montague et al. ............... 726/4 |
| 5,797,139 A | * | 8/1998 | Amro .................................... 1/1 |
| 5,835,091 A | | 11/1998 | Bailey et al. |
| 6,009,442 A | | 12/1999 | Chen et al. |
| 6,043,817 A | | 3/2000 | Bolnick et al. |
| 6,237,011 B1 | | 5/2001 | Ferguson et al. |
| 6,259,447 B1 | | 7/2001 | Kanetake |
| 6,489,968 B1 | * | 12/2002 | Ortega et al. ................. 715/713 |
| 6,513,038 B1 | * | 1/2003 | Hasegawa et al. ................ 707/7 |
| 6,621,930 B1 | | 9/2003 | Smadja |
| 2004/0056903 A1 | * | 3/2004 | Sakai ............................ 345/853 |
| 2004/0139231 A1 | * | 7/2004 | Newman et al. ............. 709/246 |
| 2004/0177319 A1 | * | 9/2004 | Horn .......................... 715/501.1 |

FOREIGN PATENT DOCUMENTS

| | | |
|---|---|---|
| EP | 0 371 602 A2 * | 10/1989 |
| EP | 1237076 A2 | 9/2002 |
| WO | 9837483 A | 8/1998 |

OTHER PUBLICATIONS

Robert Cowart, Mastering Windows 95, 1995, Sybex, pp. 36, 37, 104, 235, 498, 502, 509, 525.*
Robert Cowart, Mastering Windows 95, 1995, Sybex, pp. 178, 197-198, 499, 508.*
Cowart, Mastering Windows 95, 1995, Sybex.*
Creating and maintaining folders, 2005, Oracle®.*

(Continued)

*Primary Examiner* — Boris Pesin
*Assistant Examiner* — John M Heffington
(74) *Attorney, Agent, or Firm* — Lee & Hayes, PLLC

(57) ABSTRACT

The present invention relates to a system and methodology to facilitate automatic display and management of data items associated with a hierarchical tree arrangement of folders and subfolders. A computerized interface for data presentation is provided having a sorting component to determine categories relating to one or more items for display. A cluster component groups the categories according to discretized states in order to control visible output to the display. Such states can include packed and unpacked states, wherein packed states can cluster a plurality of items together and across several nodes, whereas unpacked items are controlled and displayed under a grouped heading in one context and as individual data items or entities in another context.

26 Claims, 9 Drawing Sheets

OTHER PUBLICATIONS

Li etal., Hubble: An Advanced Dynamic Folder Technology for XML, 2005, Proceedings of the 31$^{st}$ VLDB Converence, Tondheim, Norway, 2005.*

European Search Report dated Aug. 12, 2006 for European Patent Application Serial No. 05 000 748.3-2211, 3 Pages.

Ron Bekkerman, et al., On Feature Distributional Clustering for Text Categorization, SIGIR'01, 2001, pp. 146-153, New Orleans, Louisiana, USA.

L. Douglas Baker, et al., Distributional Clustering of Words for Text Classification, SIGIR'98, 1998, 8 pages, Melbourne, Australia.

OA dated Jan. 16, 2009 for Chinese Application Serial No. 200510005693.4, 7 pages.

Translated Chinese Office Action mailed on Jan. 17, 2011 for Chinese Application No. 2005100056934, a counterpart foreign application for U.S. Appl. No. 10/758,743.

* cited by examiner

FIG. 6

SYSTEMS AND METHODS FOR CONTROLLING A VISIBLE RESULTS SET

TECHNICAL FIELD

The present invention relates generally to computer systems, and more particularly to a system and method that groups display items according to various discretized states in order to control visible output to a display.

BACKGROUND OF THE INVENTION

Modern operating systems drive many of today's technology-based innovations by offering a platform for both hardware and software development while serving many diverse needs. These systems have evolved from more simplistic file management systems to more complex workstations that provide high-end performance at reasonable cost. Such systems often include multi-processing architectures, high-speed memory, advanced peripheral devices, a variety of system libraries and components to aid software development, and intricate/interleaved bus architectures, for example. At the core of these systems include sophisticated operating systems that manage not only computer-related hardware but, a vast array of software components having various relationships. These components are often described in terms of objects or classes having multi-tiered relationships such as in a hierarchical arrangement for files and directories that are found in many data management systems.

One aspect to managing data within the framework of an operating system or other data manager involves how various items are displayed to a user. For example, items created as documents may be kept in a document folder, whereas items created as a spreadsheet may be stored in a separate spreadsheet folder—if so desired by users creating such files. Currently, such designations as spreadsheet folder and document folder are somewhat arbitrary in that the user may also keep spreadsheets and documents in a single folder such as a working folder. After a plurality of such folders have been created having associated data items or files appearing in the respective folders, the folders may generally be viewed hierarchically in a common tree arrangement of folders and subfolders, wherein the items appearing in any selected folder are displayed as content to the user in a separate display area or pane. Items from non-selected folders however, can only be viewed when another folder is selected by the user. As can be appreciated, this type of selection process of drilling-up or drilling-down on folders and subfolders to view the content within a respective folder can be tedious, time-consuming, and inefficient. Also, when a plurality of items are viewed in a content pane, finding a particular item of interest can be problematic especially if many of the items are merely relating to a similar category or group, yet displayed as individual components having no apparent relationship between the components.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to controlling visible output to a computerized display by assigning and controlling states to item categories for display. Typical tree views for a conventional display generally provide a hierarchical index and a contents view that only displays content of a single node at a time. The present invention provides an improved system and method of generating tree views or other type views by controlling content merging of subordinate and sibling nodes. For example, a respective group can exist in two or more states such as packed or unpacked state that can be persisted on a data storage medium as a property of the group. The group which is packed can be processed as a single entity when viewed from outside, whereas items from unpacked groups can be merged together from several folders, and sorted/clustered according to current viewer criteria which can also be configured by the user.

In general, a packed group is similar to a traditional folder, whereas an unpacked group can be displayed and controlled similarly to a static list. Controls to manage these and other type groups include the ability to flip or switch states of the group from packed to unpacked and visa versa. For example, it is convenient to think of presentation folders (e.g., Power Point) as packed presentations for the purpose of delivering a speech. However, it may be convenient to unpack all presentation folders when working on a new presentation that is to reuse many existing pages. When creating a multi-level organizational hierarchy where the groups at various levels may have a meaning of composite documents (e.g., PowerPoint presentation treated as a collection of pages, programming project as a collection of source files, album as a collection of photos, workspace as a collection of related documents,) it is therefore advantageous to let users decide which of these groups (and when) should be treated as single entities packed into a group or as disparate entities distributed across the hierarchy of folders and associated subfolders.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 6 is a diagram illustrating an example query display in accordance with an aspect of the present invention.

DETAILED DESCRIPTION OF THE INVENTION

The present invention relates to a system and methodology to facilitate automatic display and management of data items associated with a hierarchical tree arrangement of folders and subfolders. A computerized interface for data presentation is provided having a sorting component to determine categories relating to one or more items for display. A cluster component groups the categories according to discretized states in order to control visible output to the display. Such states can include packed and unpacked states, wherein packed states can cluster a plurality of items together and across several nodes, whereas unpacked items are controlled and displayed under a grouped heading in one context and as individual data items or entities in another context.

As used in this application, the terms "component," "object," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
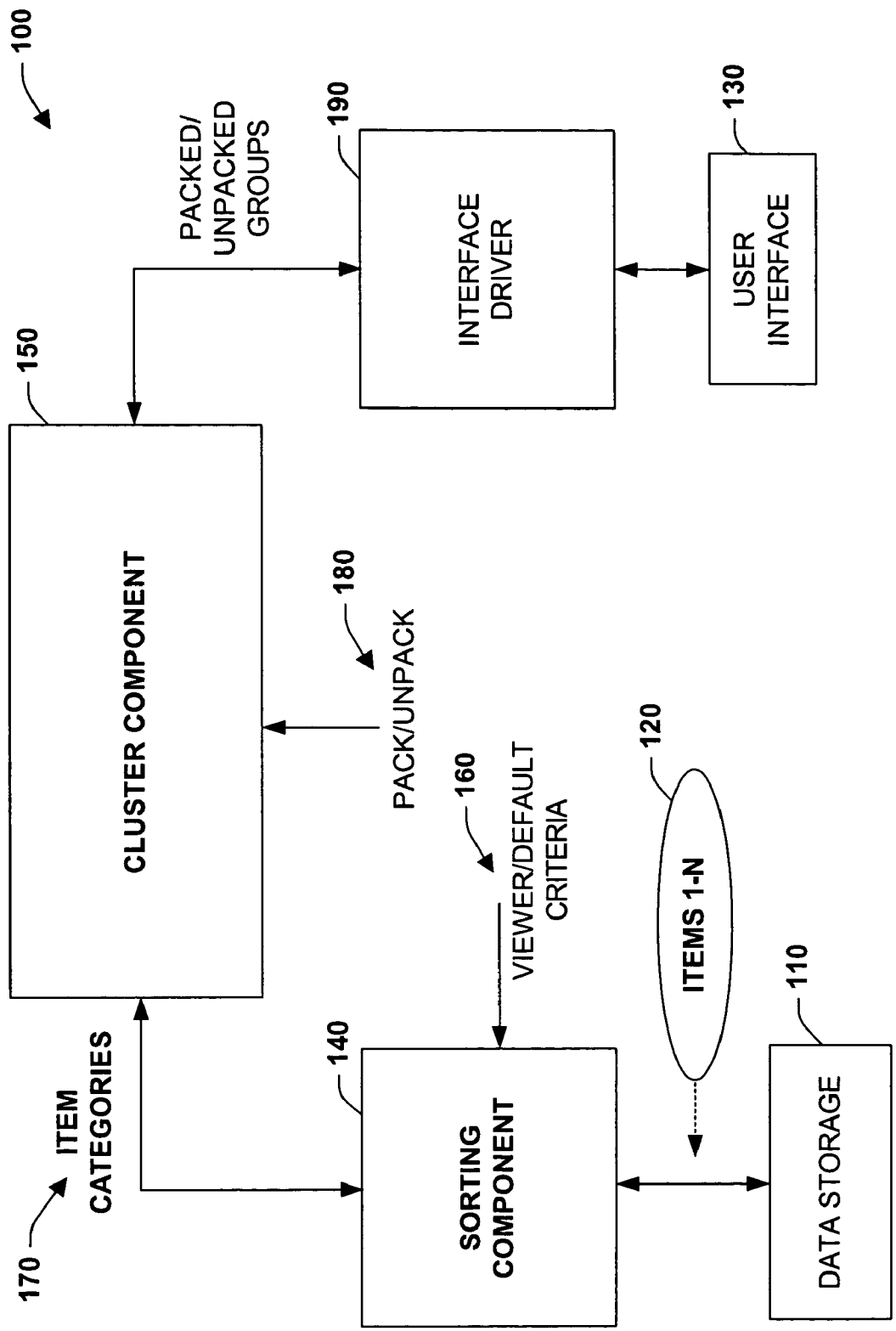
FIG. 1 is a schematic block diagram of a display control system in accordance with an aspect of the present invention.

Referring initially to FIG. 1, a display control system 100 is illustrated in accordance with an aspect of the present invention. The system 100 includes a data storage 110 that stores a plurality of data items 120 to be displayed at a user interface 130. Such items 120 can include documents, files, folders, images, source code and so forth that can appear in various viewable states at the user interface 130. The present invention provides an improved method of generating a tree view by controlling content merging of subordinate and sibling nodes (e.g., folders or individual items) at the user interface 130. In general, any group or category can exist in two (or more) states such as packed or unpacked, which is the state of the group and persisted at the data storage 110. A viewing group which is packed, can be treated as a single entity when viewed from outside the group. Items from unpacked groups can be merged together and sorted via a sorting component 140 and clustered via a cluster component 150 according to current viewer criteria or rules 160.

The cluster component 150 processes one or more item categories 170 that are determined by the sorting component 140 and provides the ability to switch a viewing state of the group of items from packed to unpacked and visa versa at 180, wherein the state can be associated with a property of a group (e.g., property as metadata associated with group or subset of data items). The switch 180 can be a flag or code associated with the collection of data items indicating whether the collection is packed or unpacked. An interface driver 190 processes packed or unpacked groups for display at the user interface 130. The user interface 130 can also direct user selections such as which data items should be grouped or ungrouped at 180 and what viewing rules 160 should be employed when viewing output at the interface.

In general, any group can exist as packed or unpacked, which is separate from the standard open/close of a display folder. Unlike open/close, which is the state of the viewer, packed/unpacked is the state of the group and is persisted on the data storage 110. A group which is packed, for example, is treated as a single entity when viewed from outside the group. It can be opened to view the content of the group, but its items are kept together (e.g., as a single stack or sub-window.) Packed groups show up in an associated content pane or window as subfolders. For example, this can include archived items, wastebaskets, PowerPoint presentations treated as a packed list of individual pages, photo albums, multi-page spreadsheets and so forth. In contrast, unpacked groups provide ways to scope or view items wherein, the items from unpacked groups are merged together and sorted/clustered according to the current viewer criteria 160.

When showing a collection of items (e.g., content of a folder, or results of a query), items that belong to any packed group are removed from the view and hidden inside the representation of that group. The packed group may be a subgroup (fully contained within the collection), or an overlapping group. Consequently, two representations (e.g., icons) of packed groups are provided, one representing a subgroup, and one representing an overlapping group. For example, a single archive or wastebasket group that spans multiple folders and hides items from direct view can be provided as an overlapping group (if it contains some items from the current view and other items that do not belong with the current view) or subgroup (if all items within it belong to the current view). It is noted that if a packed group is a subgroup, then it may not be shown in the tree pane, but in the content pane, however, various implementations are possible. In contrast, an overlapping group should always appear in the tree pane (clicking on the group should show the whole content of the group) and in the content pane (opening the group would reveal the intersection of the group with the current view).

It is noted that the user interface 130 includes a display (not shown) having one or more display objects (not shown) including such aspects as configurable icons, buttons, sliders, input boxes, selection options, menus, tabs and so forth having multiple configurable dimensions, shapes, colors, text, data and sounds to facilitate operations with the system 100. In addition, the interface 130 can also include a plurality of other inputs or controls for adjusting and configuring one or more aspects of the present invention and as will be described in more detail below. This can include receiving user commands from a mouse, keyboard, speech input, web site, remote web service and/or other device such as a camera or video input to affect or modify operations of the interface 130 or other aspects of the system 100.

Figure 2:
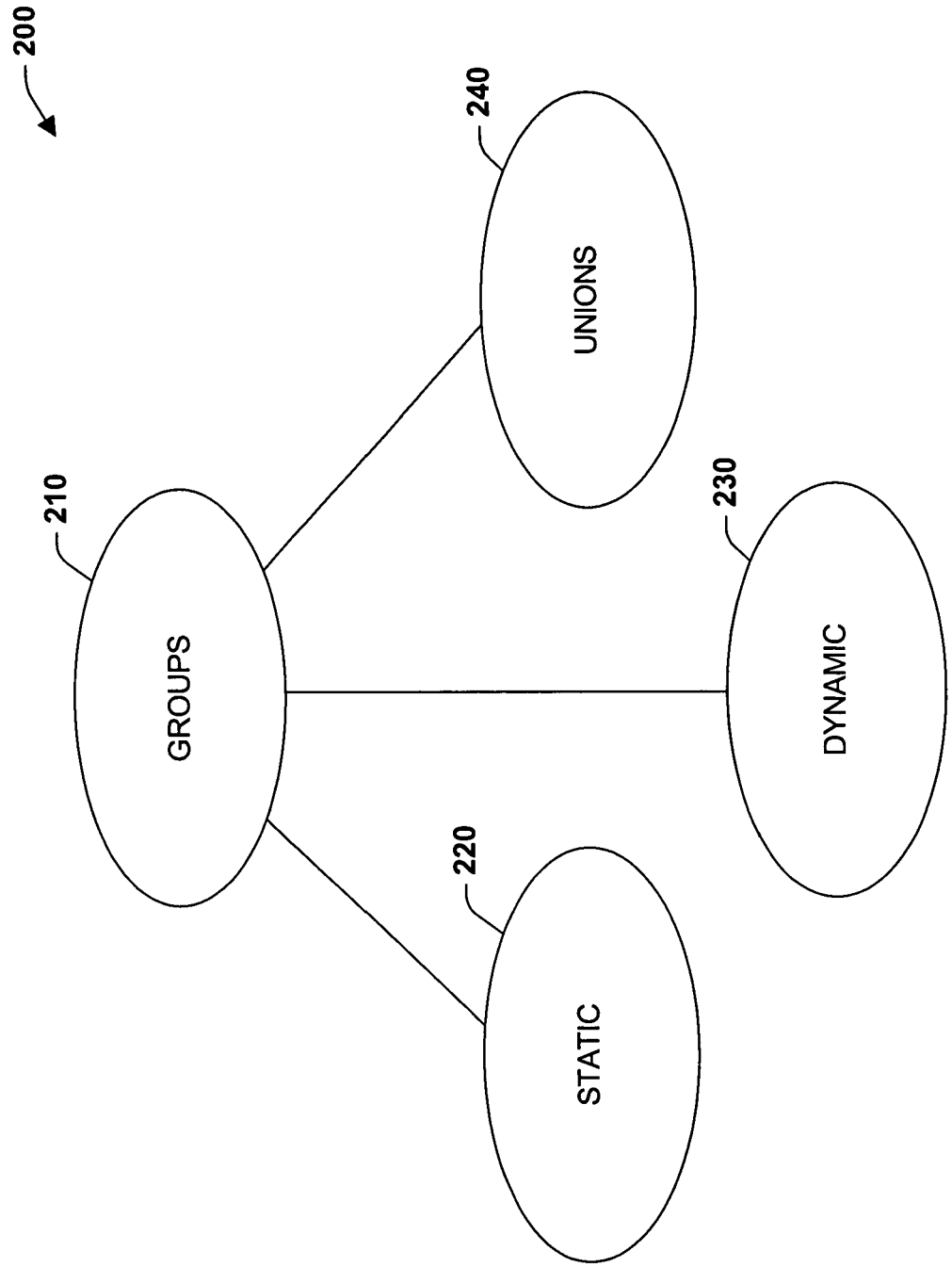
FIG. 2 is a diagram illustrating group considerations in accordance with an aspect of the present invention.

Referring now to FIG. 2, various group considerations 200 are illustrated in accordance with an aspect of the present invention. A group 210 can be static 220 (e.g., folder, or static list,) or dynamic 230 (e.g., defined by a query). Generally, dynamic queries and property clusters are treated as unpacked. By defining a packed query, items may be hidden from view dynamically. For example a packed query can be defined that includes all items older than 30 days. Then, any collection of items will only show the recent items—older items associated with the packed query will be hidden from view inside a query icon, for example.

Systems adapted in accordance with the present invention may predict initial or default states of any newly created group, and either set the state automatically, or prompt the user to confirm the choice. Typically, most user-created groups should default to an unpacked state. The system may suggest the packed state if:

(1) The name of the group contains some recognizable special words, like "archive", "junk", "process", etc.

(2) The content of the group (items put into it) are of low importance (e.g., not observed or manipulated in a year).

(3) The type of the group (additional group properties) indicates a compound document rather then a loose collection of items. In particular, compound documents created by applications (e.g., PowerPoint presentation, programming project, MHTML page) should be automatically created in a packed state.

Packing also allows finding an intersection of two overlapping groups at 230. When viewing a group A, for example, items belonging to group B can be removed from the view by packing with group B. Thus, the view of group A shows items in A-B, and by opening the subgroup B, the items in A∩B can be viewed. Also, a viewer can be provided that supports finding a union of groups A and B. This can be achieved by multi-selecting the nodes in the tree view via the standard Shift-click or Ctrl-click operations, for example.

Figure 3:
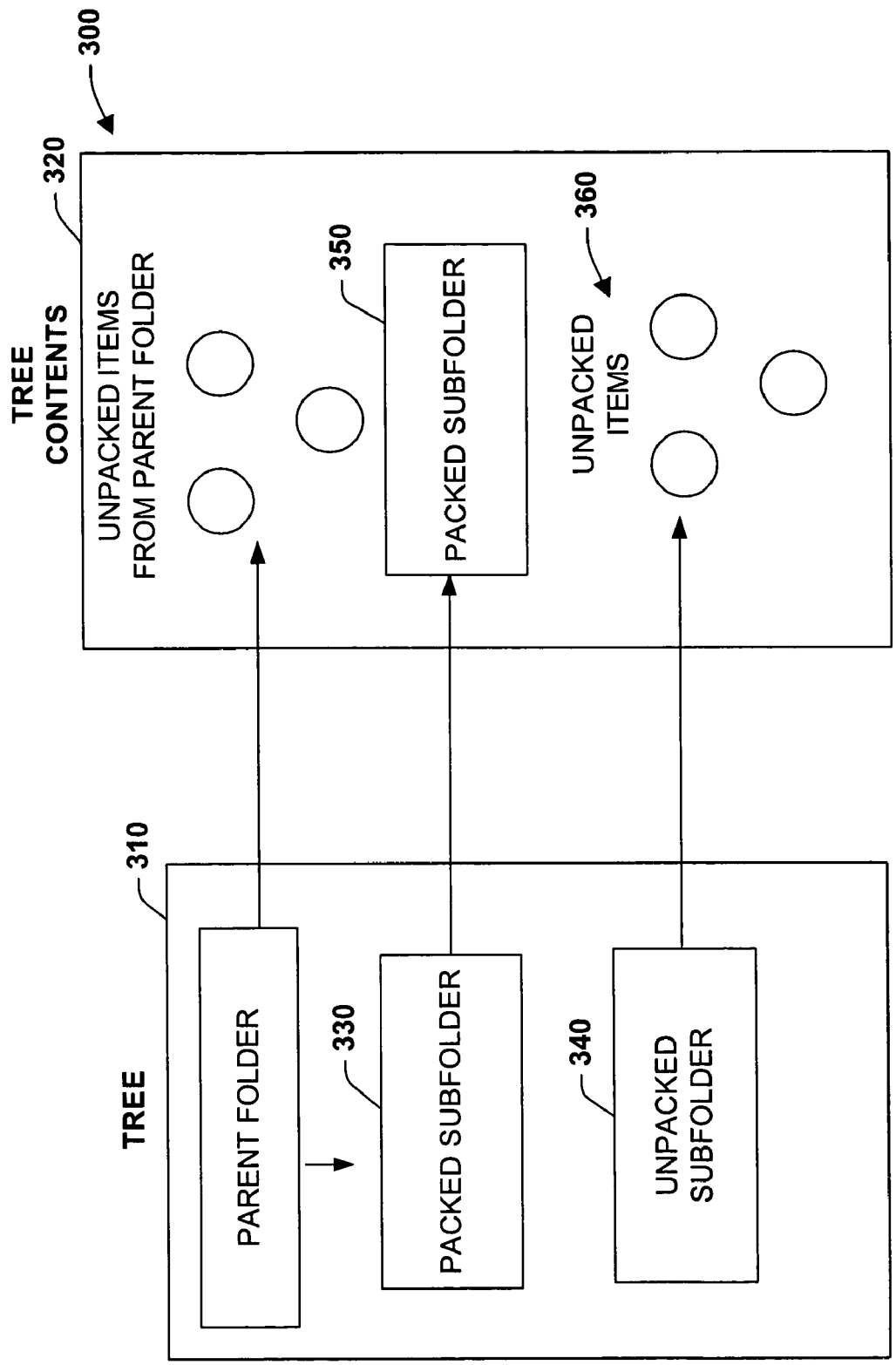
FIG. 3 is a diagram illustrating output display considerations in accordance with an aspect of the present invention.

Turning to FIG. 3, output display considerations 300 are illustrated in accordance with an aspect of the present invention. In this aspect, a tree display 310 and associated tree contents 320 are illustrated. The tree display 310 depicts a parent folder with two example subfolders—a packed subfolder or group at 330 and an unpacked subfolder or group at 340. As noted above, other type of groupings are possible such as unions between groups which are described in more detail below. When the parent folder is selected for viewing in the tree display 310, unpacked items from the parent folder appear in the content pane 320, together with unpacked items from the unpacked subfolder (mixed together), and an iconic representation of the packed subfolder. When viewing a packed subfolder (by selecting it in the tree view 310) the tree content 320 should show the content on the group—the same for an unpacked subfolder. (Selecting any group or folder in the tree view is an equivalent of opening it.) For example, these items belonging to the unpacked group or folder 340 can have properties associated with the item that identify the item as a member of the unpacked group. As can be appreciated, the tree 310 can have a plurality of packed folders, unpacked folders, and/or folders that represent items from various collections of folders. Likewise, the tree contents 320 can display a plurality of packed groups, overlapping groups, and/or individual items that are associated with unpacked groups or collections.

Figure 4:
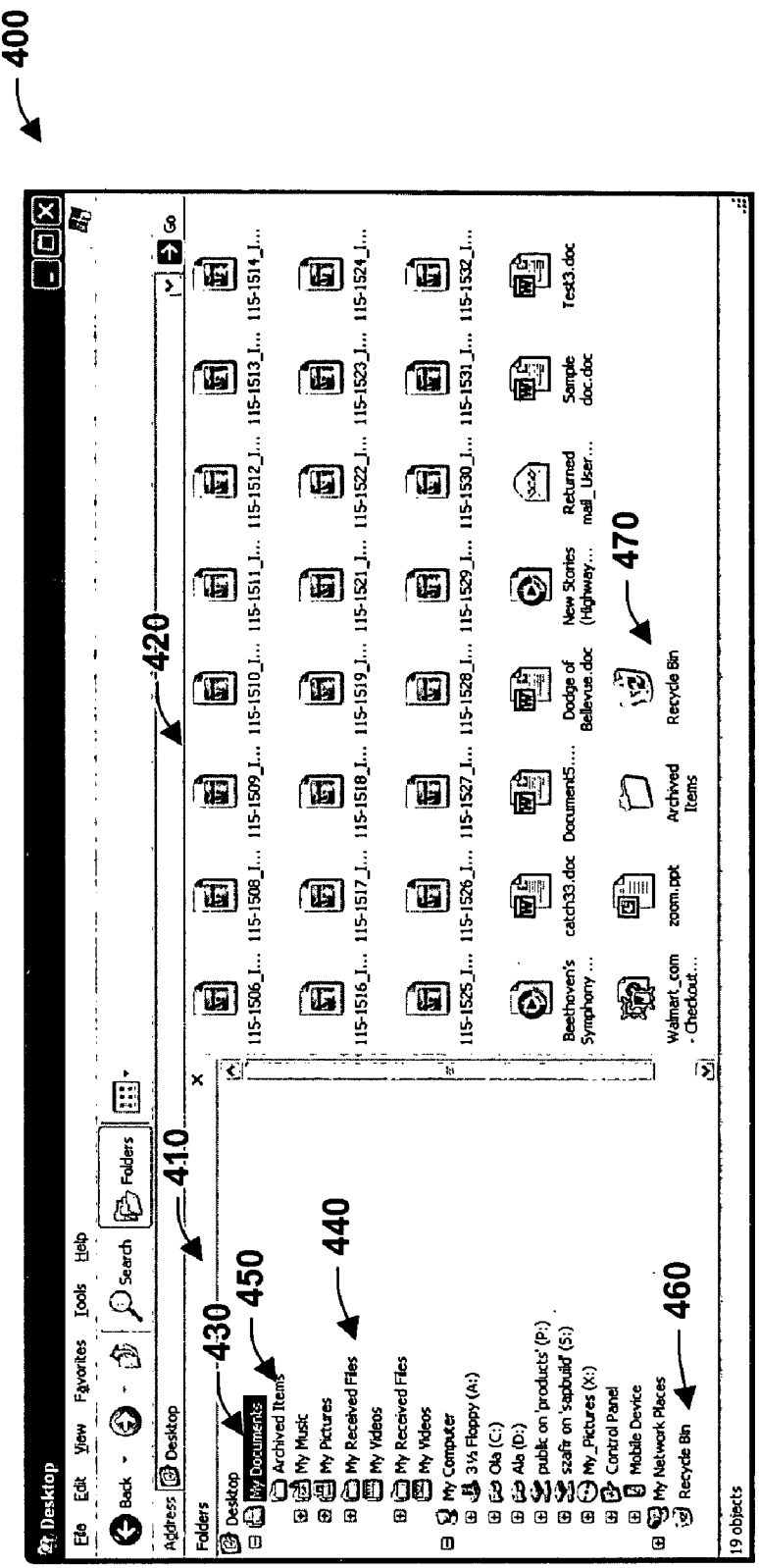
FIG. 4 is a diagram illustrating an example tree display in accordance with an aspect of the present invention.

FIG. 4 illustrates an example tree display 400 in accordance with an aspect of the present invention. It is to be appreciated that the display 400 depicts one particular example implementation of the present invention and that various other displays are possible. The display 400 includes a tree pane 410 and a content pane 420 that displays data representations of items appearing in the tree pane 410. The tree pane 410 includes packed, unpacked, or overlapping groupings of items relating to various categories. For example, a My Documents folder 430 contains a number of subfolders 440. Unpacked subfolders show up in the folder tree and associated items are merged into the content pane 420 (e.g., picture and music files.) There are also two packed folders: Archived Items 450 and Recycle Bin 460. The associated content for these folders is represented by folder icons at 470 and not shown until the folder is opened, which can occur at the tree pane 410 or the content pane 420. Also, Recycle Bin is an overlapping folder, whereby it may contain items from multiple places. By clicking on the Recycle Bin icon, for example, in the content pane 420, the items that were originally in My Documents folder or any of its unpacked subfolders are displayed.

Figure 5:
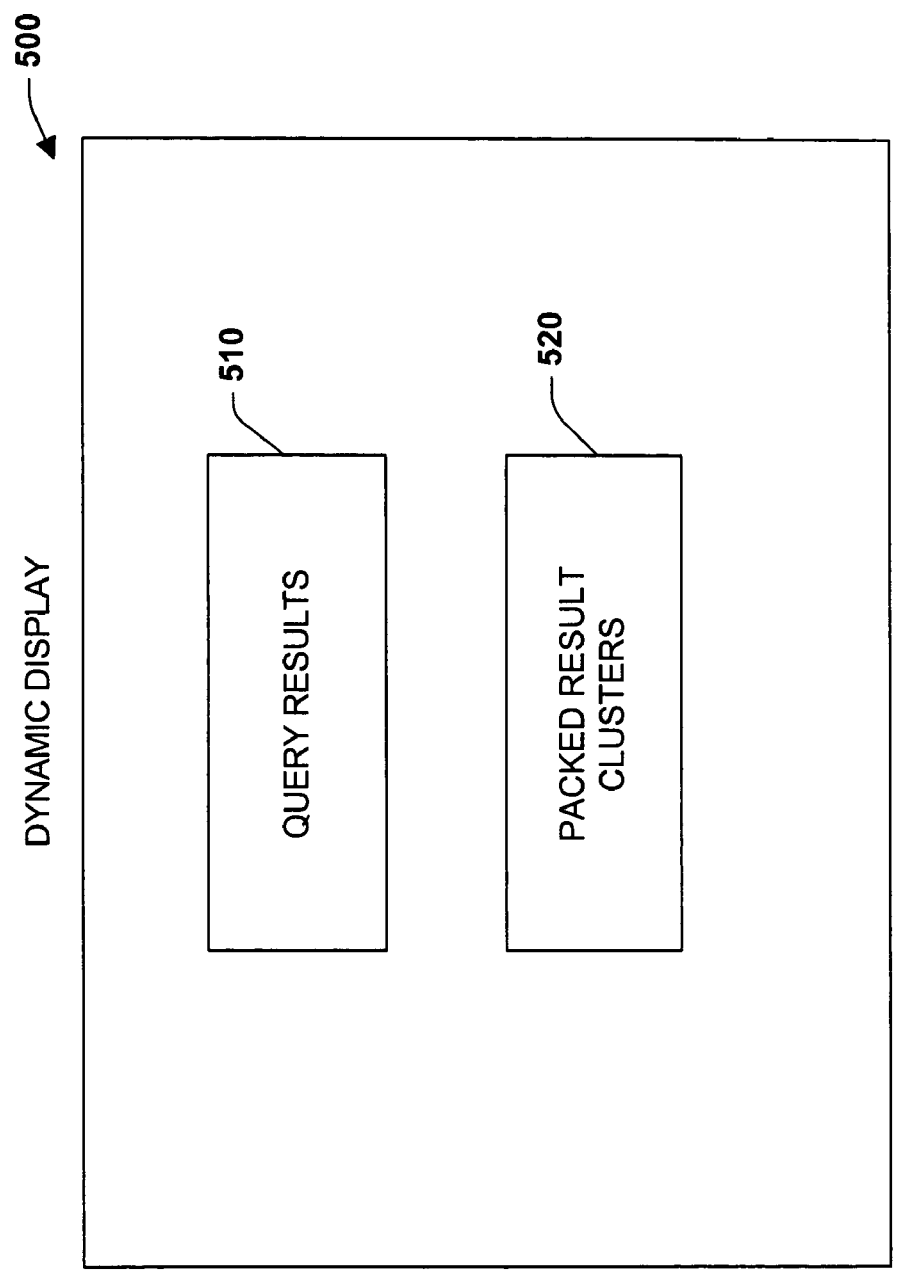
FIG. 5 is a diagram illustrating dynamic display considerations in accordance with an aspect of the present invention.

FIG. 5 illustrates dynamic display considerations 500 in accordance with an aspect of the present invention. In this aspect, results from queries can be returned to a display at 510. These queries can be submitted by users to searching utilities such as search engines, for example. The queries may be submitted as users attempt to find or retrieve information relating to a particular topic or in regard to retrieving desired data that was previously acquired or created by the user that may be stored locally, remotely, or a combination of local and remote locations.

At 520, packed query results may also be presented to the user. These type queries act to organize a user's display during return of query results, wherein results contained in the packed query 520 are hidden or partially hidden from view. In general, items are considered unpacked by default. The procedure to find the state of an item starts from searching if it belongs to any packed group(s). If yes, the icon(s) for the respective groups will be displayed. Otherwise, the item is unpacked and will be displayed directly. In one example, items stored or created before a certain date are to be clustered and not presented as individual items in the returned query results 510. In an e-mail example, a user may define all results from a particular company or individual are to be packed. As can be appreciated, various designations for clustering results can be provided. For example, items can be clustered by topic (e.g., items for mustang horses packed under animals, items for mustang cars to be displayed as results from query), name, individual, entity, time, particular dates (e.g., holidays), and so forth. In general, categories that are received from files associated with tagged properties are presented under a packed label or other type designation, wherein items in such categories can be further examined if desired by selecting the packed grouping of results.

Figure 6:
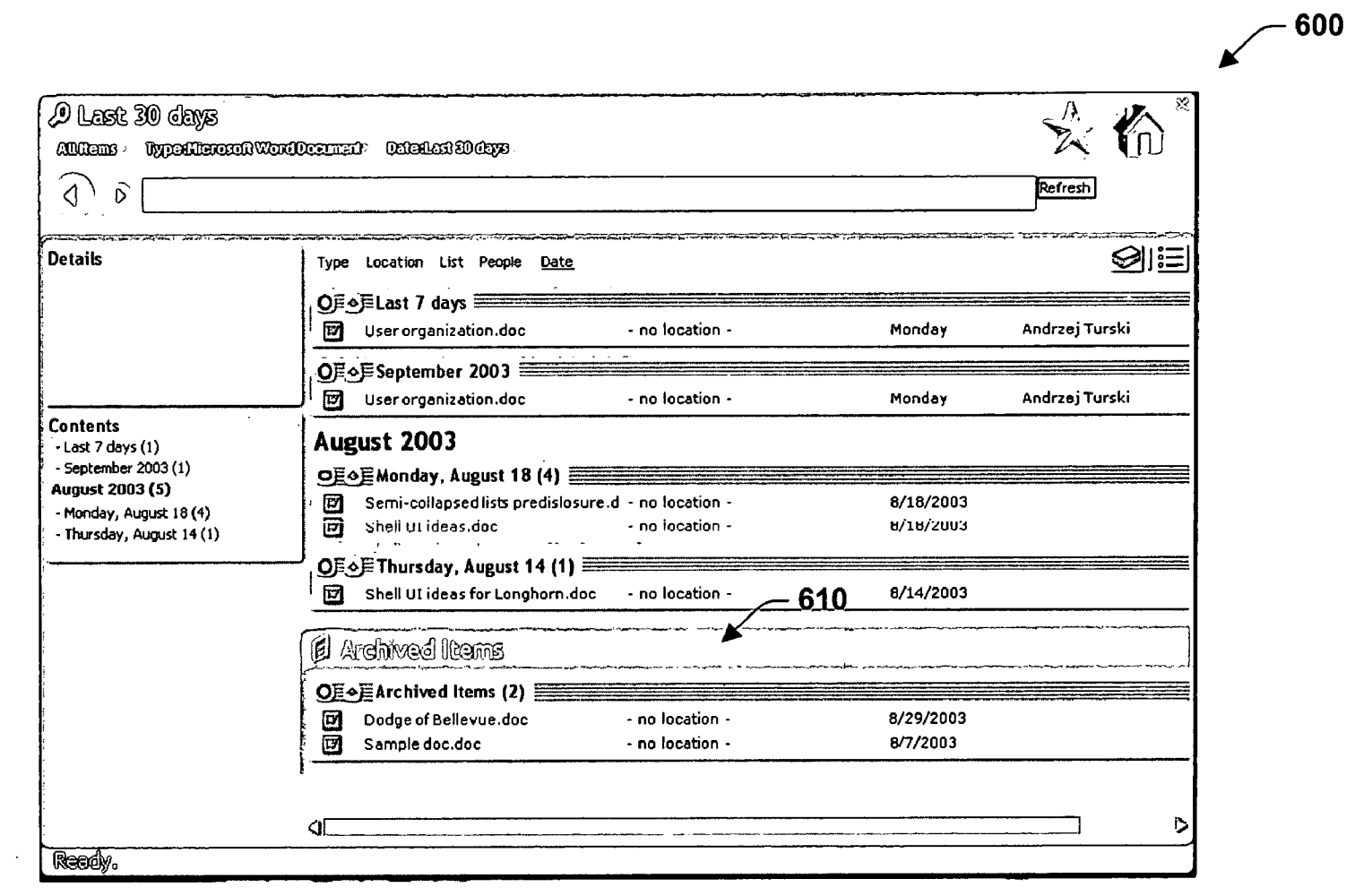

FIG. 6 illustrates an example query display 600 in accordance with an aspect of the present invention. In this aspect, results are returned and displayed according to various sorting criteria. The display 600 shows the results of a query for Word documents from the last 30 days, for example. Query results can be organized by time clusters, for example. However, items from a packed Archived Items folder are shown grouped together and separate from all other items at 610. It is noted that this view 610 assumes an Archived Items folder was opened in place. Normally, it would be shown closed without any items appearing for display unless a user specifically selected the Archive for display.

Figure 7:
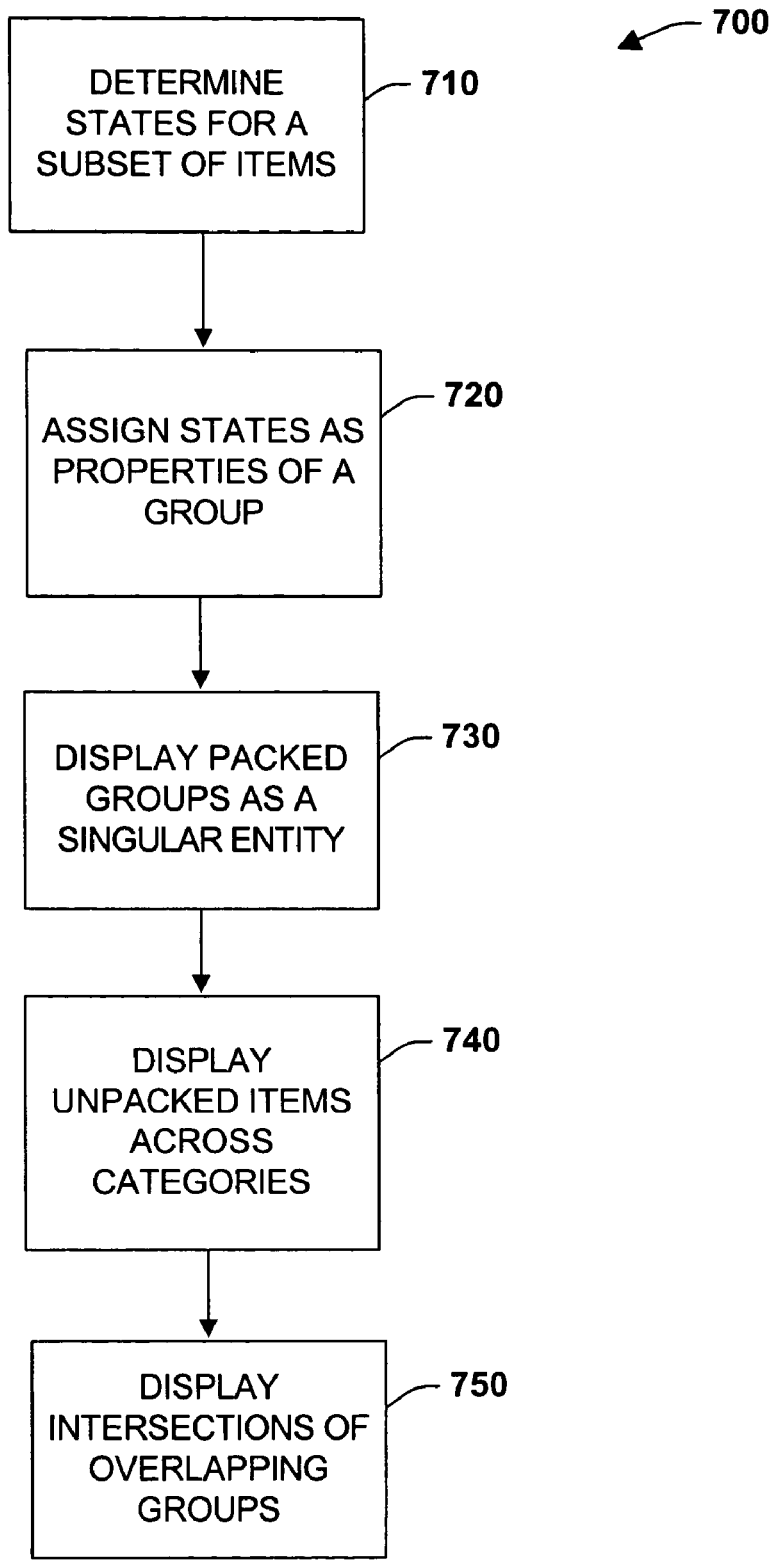
FIG. 7 is a flow diagram illustrating a display control process in accordance with an aspect of the present invention.

FIG. 7 is a flow diagram illustrating a display control process 700 in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 710 of FIG. 7, various states are determined for a subset of items. As noted above, one type of state can include a packed state and another type of state can include an unpacked state. Packed states indicate which items, when displayed, are to be displayed under a category heading associated with a term or tag defining members of the category. For example, ten files may be identified as individual members of a packed group called presentation. Such group when displayed can be represented in an iconic form labeled presentations. In another example, twenty files may be tagged as belonging to an unpacked group pictures. Thus, in one view (e.g., tree view) the unpacked group appears as a collection appearing under the label pictures, but in another form (e.g., contents view) the unpacked group would appear as the twenty individual entities composing the unpacked group.

At 720, the states determined above are assigned as properties of a group. This can include associating metadata with a file, defining a metadata property for the file, and assigning a respective state to the property associated with the file. For example, all pictures associated with an album folder can be assigned the state unpacked as a property of the file. When these files are collected for presentation, an icon labeled "album" can appear in a tree representation of such files as opposed to displaying the individual representations of the pictures. In another example, items associated with an archive bin can be labeled or tagged as packed and thus remain in iconized form when looking at any other view.

At 730, packed items are displayed as a singular entity, whereas unpacked items are displayed as individual entities or components at 740. For example, items assigned a packed designation appear as a packed folder in a tree display under a singular icon and also appear as a packed folder under a singular icon when looking at any other view containing any of the packed folder items. In contrast, items assigned to an unpacked group appear under a singular icon in the tree display but appear as individual or unpacked components in a more detailed display such as a content display. At 750, mixed or overlapped type of groupings can be processed and displayed. For example, contents of a recycle bin or archive bin folder can be displayed in packed form in both a tree and content display if desired. However, items belonging to such groups may be derived from several categories such as pictures, presentations, documents, files and so forth that have previously been discarded or archived, yet originated from different groups, folders, or categories. If such an item were selected from the contents pane for display, only those items originating from the parent folder (e.g., My Documents that have been archived or recycled) would appear as items in the content pane for display.

Figure 8:
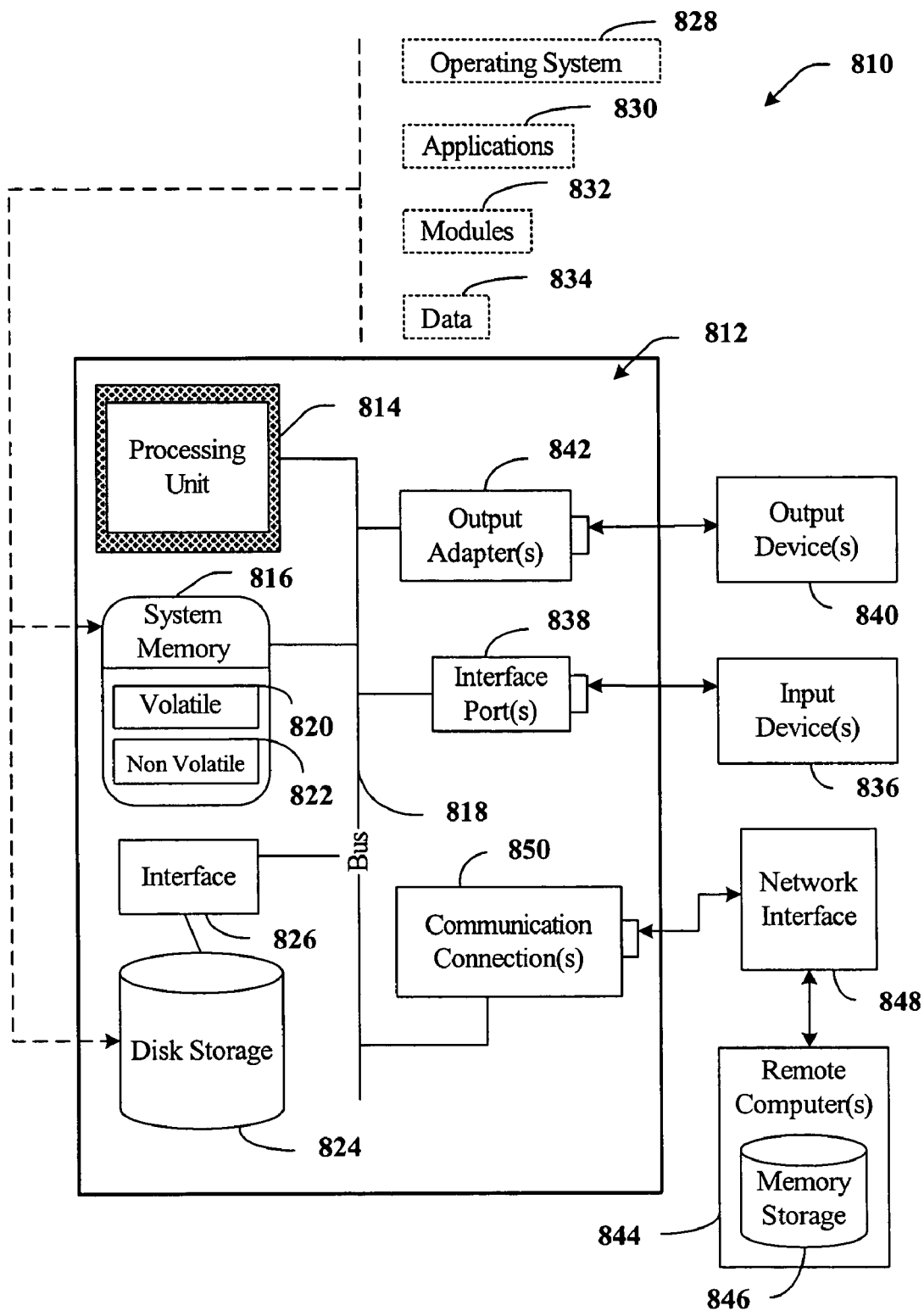
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
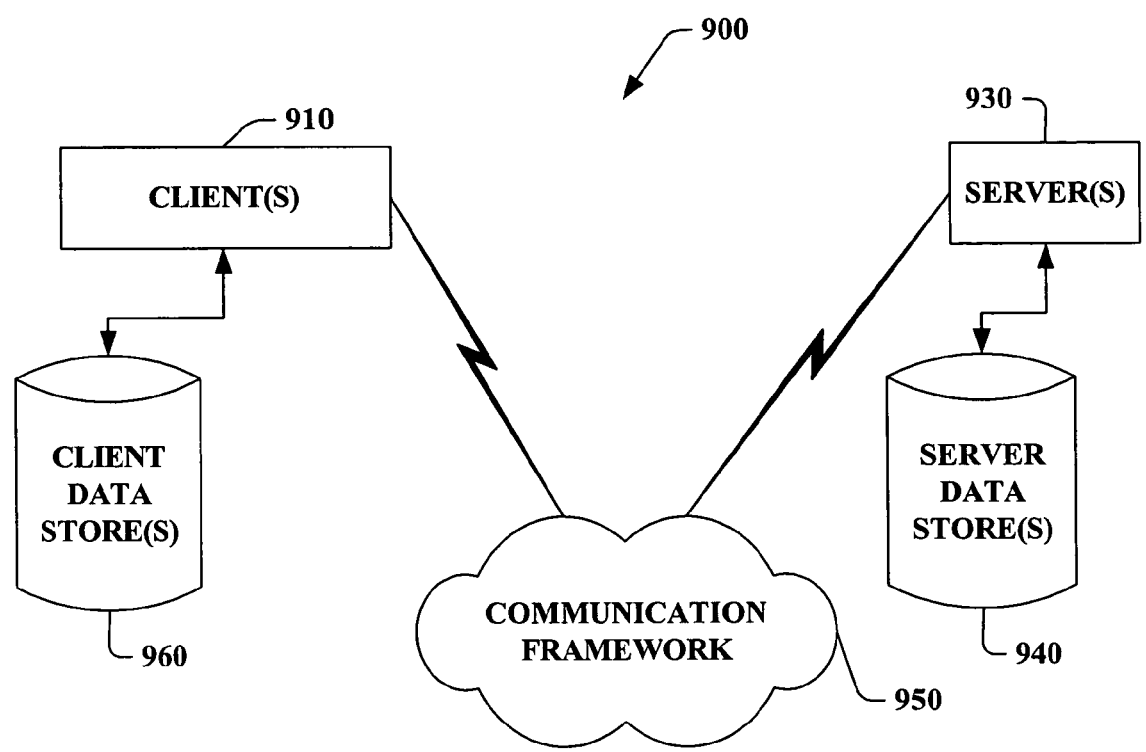
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for data presentation, comprising:
 a processing device;
 a sorting component that is operable by the processing device, the sorting component being configured to determine categories relating to one or more data items for display on a display device, wherein the data items are structured within a hierarchical folder structure; and
 a cluster component that is operable by the processing device, the cluster component being configured to facilitate grouping the categories according to discretized states, wherein the discretized states are a property which is assigned to each grouped category via the cluster component, to control visible output to the display device, and wherein the discretized states include a packed state that, when assigned, causes grouped data items from multiple different folders in a grouped category to be displayed as one icon that represents the grouped data items in the grouped category to which the packed state is assigned, and an unpacked state that, when assigned, causes each data item in the grouped category to be displayed as one icon that represents the grouped category in a tree display and as individual icons when viewed in a contents display, wherein the grouped data items are displayed as a union with other items from a particular folder of the multiple different folders when viewed in the contents displayed with respect to the particular folder.

2. The system of claim 1, further comprising a user interface for displaying the data items on the display device and a data storage for storing the data items.

3. The system of claim 1, wherein the data items include at least one of a document, a file, a folder, a sub-folder, a presentation file, an image file, an audio file, a result from a query, an archive, or a computer readable code file.

4. The system of claim 2, wherein the user interface includes at least one of a tree display or a tree display and a contents display, wherein the contents display represents items from the tree display.

5. The system of claim 2, wherein the cluster component controls content merging of subordinate and sibling nodes at the user interface.

6. The system of claim 1, wherein the discretized states are persisted on a data storage component.

7. The system of claim 6, wherein the discretized states are associated with properties of a group.

8. The system of claim 7, wherein the properties are associated with metadata relating to an item.

9. The system of claim 1, further comprising a rules component for determining how the data items are to be displayed on the display device.

10. The system of claim 1, further comprising a switch component for selecting between the discretized states.

11. The system of claim 10, further comprising an interface component to enable users to assign states to an item or group.

12. The system of claim 10, wherein the switch component is a flag associated with a collection of data items that indicates whether the collection is packed or unpacked.

13. The system of claim 1, wherein the grouped data items are an overlapping group that includes content from the multiple different folders.

14. The system of claim 13, wherein the overlapping group includes a recycle group or an archive group.

15. The system of claim 13, further comprising an interface configured to present a view of the grouped category that includes at least one group A and at least one group B that shows items in A minus B and a view of subgroup B, which presents data items within an intersection of A and B.

16. The system of claim 1, further comprising an interface to display at least one of a static group or a dynamic group.

17. The system of claim 16, wherein the dynamic group is associated with at least one of an unpacked query or a packed query.

18. The system of claim 1, further comprising a component to predict an initial or default state of a newly created group, wherein the component selects the state automatically, or prompts a user to confirm the automatically selected state.

19. The system of claim 18, wherein the predicting component suggests a packed state for a newly created group when a condition is met, the condition comprising:

a name of a group contains recognizable words;

contents of the group are of low importance; or a type of the group indicates a compound document rather than a loose collection of items.

20. A system for organizing data at a computerized display, comprising:

one or more processors;

means operable by the one or more processors for determining a state for a subset of data items from multiple folders, wherein data items are organized in a hierarchical directory tree structure;

means operable by the one or more processors for assigning the state as a property to the subset of data items; and means operable by the one or more processors for displaying each data item in the subset according to the determined state, wherein, when the state is determined to be in a packed state, the displaying means causes the data items in the subset to be displayed as one icon that represents all of the data items in the subset, when viewed from any directory location which contains at least one of the data items in the subset and wherein, when the state is determined to be in an unpacked state the displaying means causes the data items in the subset to be one icon that represents all of the data items in the subset in a tree display and as respective individual icons when viewed in a contents display, the respective individual icons being displayed as a union with other data items of a folder that are determined to be in the unpacked state.

21. The system of claim 20, further comprising means for displaying the subset of data items as an overlapping group.

22. The system of claim 21, further comprising means for controlling the state of the subset of data items.

23. A method for controlling visible output to a display, comprising:

determining a state of a collection of data items from multiple different folders, the state being determined from states comprising a packed state and an unpacked state, wherein the collection of data items are organized in a hierarchical structure;

grouping the data items according to the determined state;

displaying a group of data items as one icon that represents the multiple data items in the group of data items, in the display when the group is viewed from any folder within the hierarchical structure that contains at least one of the data items in the group of data items, when the group of data items is determined to be associated with the packed state;

displaying the group of data items as one icon that represents the multiple data items in the group of data items in a tree view and as individual icons in a contents view that displays the individual icons as a union with other data items from a particular folder of the multiple different folders when viewed in the contents display with respect to the particular folder, when the group of data items is determined to be associated with the unpacked state;

switching the group of data items from being associated with the packed state to the unpacked state or vice versa.

24. The method of claim 23, further comprising associating the state with a property of the group.

25. The method of claim 24, further comprising persisting the property to a storage medium.

26. The method of claim 24, further comprising displaying the group of data items as an overlapping group.

* * * * *